Oct. 17, 1933.   H. L. MUELLER   1,931,151
METHOD OF MAKING ANNULAR METALLIC STRUCTURES
Filed Sept. 26, 1930   2 Sheets-Sheet 1
Fig. 1
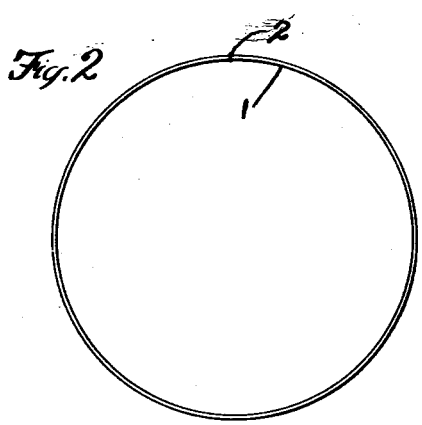
Fig. 2
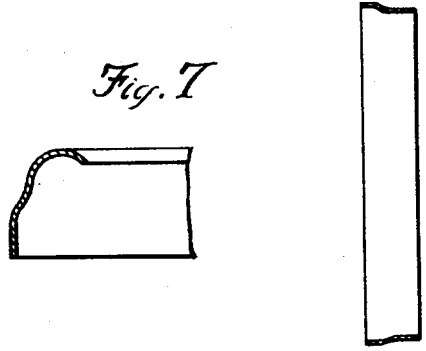
Fig. 6
Fig. 7
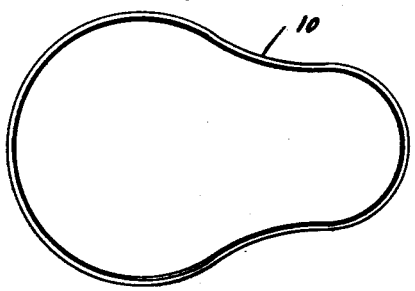
Fig. 10
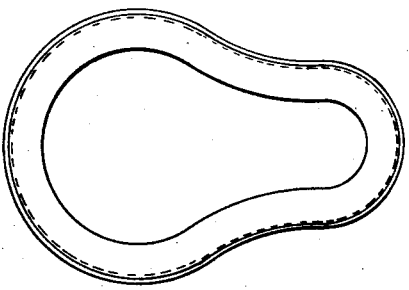
Fig. 11
Fig. 12
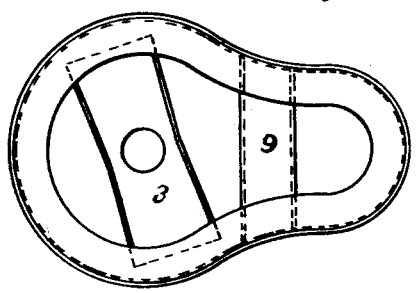
Fig. 13
INVENTOR.
Homer L. Mueller
BY
Fay Oberlin & Fay
ATTORNEYS Oct. 17, 1933.  H. L. MUELLER  1,931,151
METHOD OF MAKING ANNULAR METALLIC STRUCTURES
Filed Sept. 26, 1930  2 Sheets-Sheet 2

INVENTOR.
Homer L. Mueller
BY
Fay Oberlin & Day
ATTORNEYS.

Patented Oct. 17, 1933

1,931,151

UNITED STATES PATENT OFFICE 1,931,151

METHOD OF MAKING ANNULAR METALLIC STRUCTURES

Homer L. Mueller, Lakewood, Ohio, assignor to The Cleveland Welding Company, Cleveland, Ohio, a corporation of Ohio Application September 26, 1930
Serial No. 484,576

5 Claims. (Cl. 113—116)

The present invention relates to the manufacture of annular steel structures consisting of a circumferential section and axial flange section which heretofore have been made by a stamping process involving extremely heavy and expensive machinery. It is the general object and nature of my invention to provide a process which is characterized by greater economy and production of a lighter structure of adequate strength which is substantially one integral piece. Further advantage of my process lies in the extreme simplicity and decreased time of production as well as the elimination of collateral steps such as grinding, machining and trimming.

More particularly my invention contemplates the method of forming a circular element, rolling a flange thereon, and then distorting by means of properly placed dies and guides to the desired peripheral shape. To the accomplishment of the foregoing and related ends, said invention, then, consists of the means hereinafter fully described and particularly pointed out in the claims.

The annexed drawings and the following description set forth in detail one approved method of carrying out the invention, such disclosed method however, constituting but one of the various ways in which the principle of the invention may be used.

Figure 8:
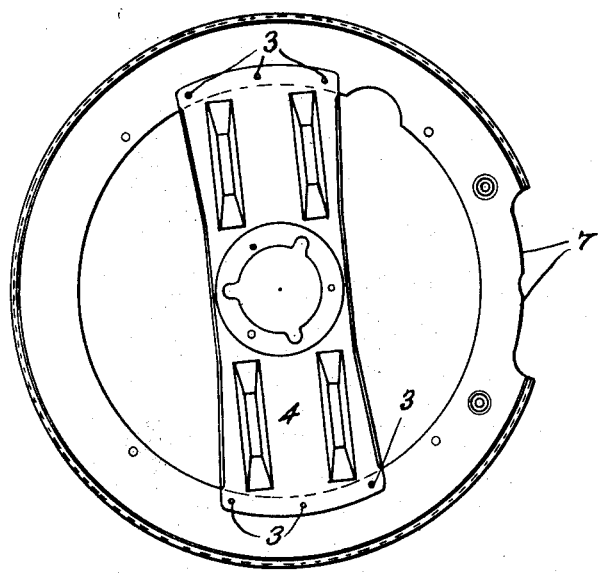
Figure 9:
Figure 5:
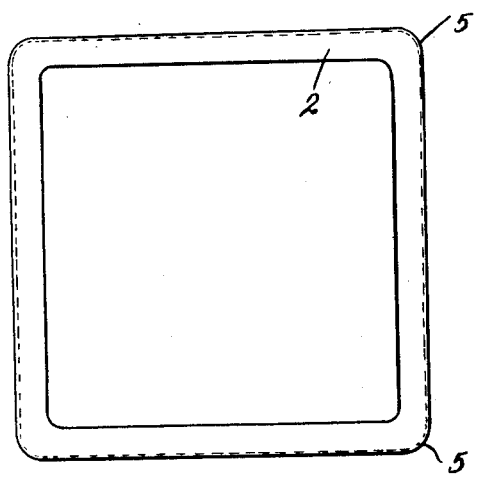

In the accompanying illustrations:

Figs. 1 to 4 inclusive show the operations necessary to form a simple circular straight-flange structure; Fig. 5 illustrates a pear-shaped structure; Figs. 6 and 7 are operation steps in the rolling of a circular structure having a variegated annular form; Figs. 8 and 9 are top and side views of the completed structure of the above form; Figs. 10 to 13 are operation steps in the formation of another shape, namely that which is used in a washing machine support which carries a washing machine tub contiguous to a centrifugal dryer; Fig. 12 is a cross-sectional fragmentary view of the circumferential and axial flange element of the above structure.

For purposes of the present description, the process will be outlined in connection with the formation of upper members of the support frames for household clothes washing machine.

Figure 3:
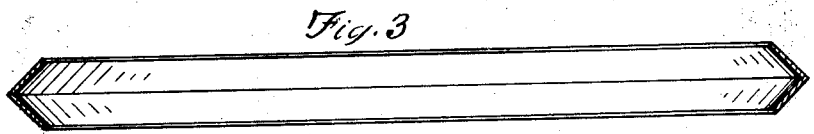
Figure 4:
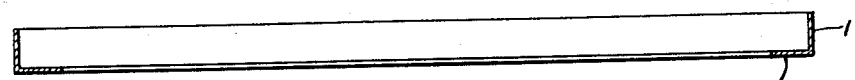

A piece of sheet or stock 1, Fig. 1, is rolled into a circular band as in Fig. 2, the contiguous ends are then joined to each other by a welding joint 2 forming a cylindrical section which is then rolled into a V-shaped cross-section as shown in Fig. 3. The next step increases the angle between the rim and the flange to 90°. By rolling the flange in this manner, that is, in two steps, a stronger product is obtained, than where a rectilinear flange is produced in one operation because the conformity to shape is more gradual and fatiguing stresses are less liable to be set up in the metal. This resultant circular flange ring may now be used in its present shape by the attachment of auxiliary legs and cross members.

In order to carry the process and steps farther and provide a frame of square contour illustrated by Fig. 5, it is subjected to the action of a set of quadrant dies in conjunction with properly placed guides to prevent ruffling of the metal and to insure an even flow thereof.

If a structure of variegated cross-section is desired, the cylindrical shell is subjected to a sizing process as shown in Figs 6, 7 and 9. A transverse support member 4 may then be added to the structure by means of spot welding at points 3. The numeral 7 is a cut-away section designed to permit the extension of a motor drive mechanism.

In making the pear-shaped frame shown in Fig. 13, the procedure is varied to the extent that the flat cylindrical rim is first distorted by means of the dies and guides to the pear-shaped contour, Fig. 10, and the flange sections are rolled into the form shown in Figs. 11 and 12. Transverse supports 8 and 9 may be attached to the frame as in Fig. 13. This particular change in the order of the steps of the process is resorted to so as to prevent a weakening of the metal at the concave portions 10 of the frame because if the flange section was present when the distortion was formed, extreme strain would be forced upon that particular metal in said concave portions.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:

1. In the manufacture of metallic articles of the character described, a method consisting of providing a cylindrical element by means of circularizing a flat blank, welding together the ends thereof, producing an axially flanged section thereon and distorting to an out-of-round peripheral contour.

2. In the manufacture of metallic articles of the character described, a method consisting of providing a cylindrical element by means of circularizing a flat blank, welding together the ends thereof, distorting to an out-of-round peripheral contour and producing thereon an axially flanged section.

3. In the manufacture of metallic articles of the character described, a method consisting of providing a cylindrical element, producing thereon axial and radial flanges of variegated cross-section, and distorting to an out-of-round peripheral contour.

4. In the manufacture of metallic articles of the character described, a method consisting of providing a cylindrical element, distorting to an out-of-round peripheral contour, and producing axial and radial flanges thereon having a variegated cross-section.

5. In the manufacture of metallic articles of the character described, a method of providing a cylindrical element by means of circularizing a flat blank, welding together the ends thereof, initially converging the walls of said cylindrical element to an obtuse angle in relation to each other, finally bending said walls into rectangular axial and radial flanges, and then distorting the flanged element to a non-circular peripheral contour.

HOMER L. MUELLER.